Oct. 5, 1971    G. RUDOLF ET AL    3,609,815
INJECTION MOLDING MACHINES
Filed Jan. 10, 1969    3 Sheets-Sheet 1
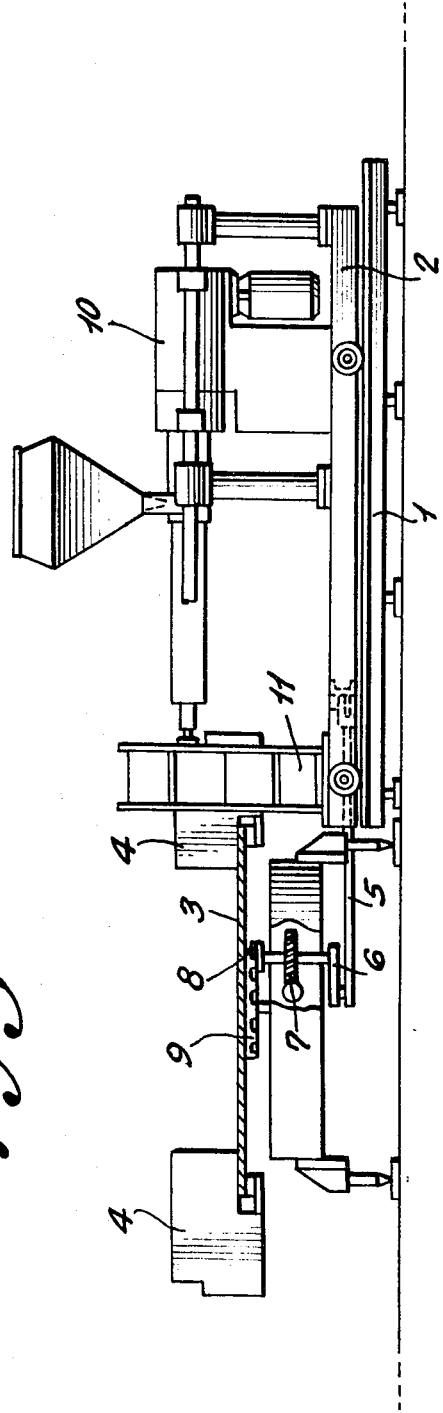
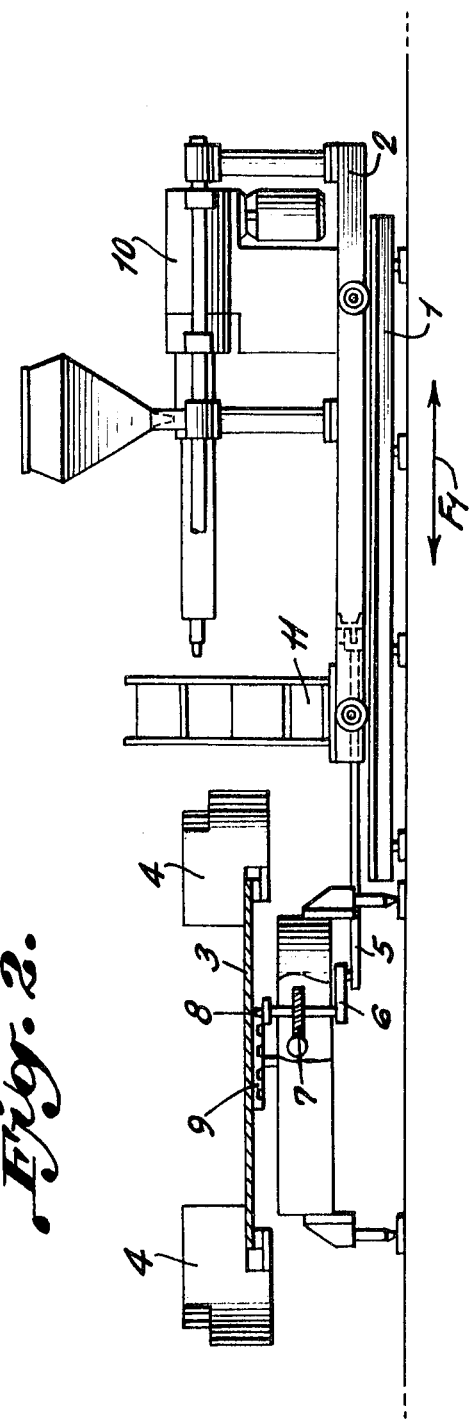
INVENTORS
GUY RUDOLF
GLAUDE LEBRETON
BY Holman, Glascock, Downing &
Seebold
ATTORNEYS

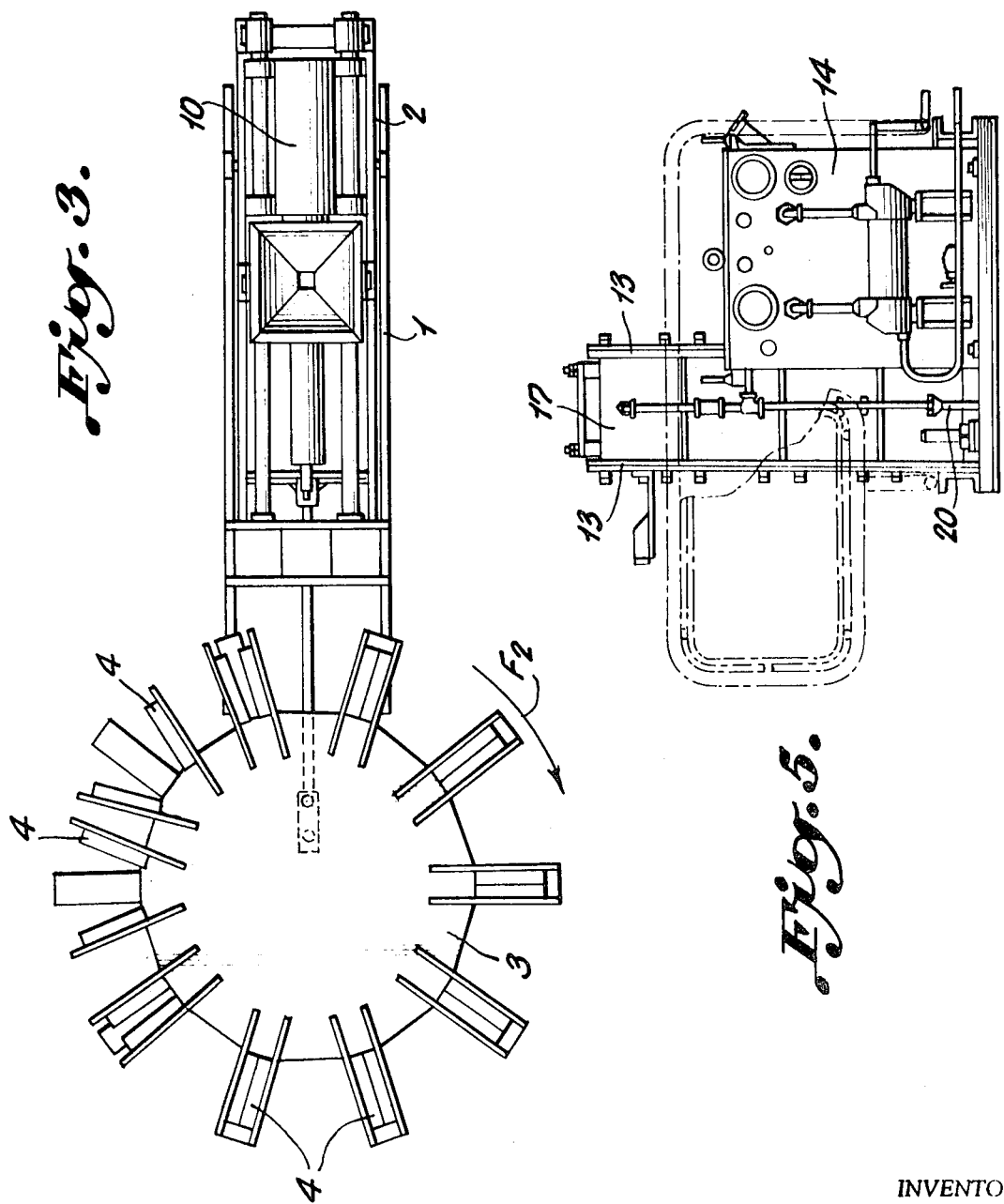

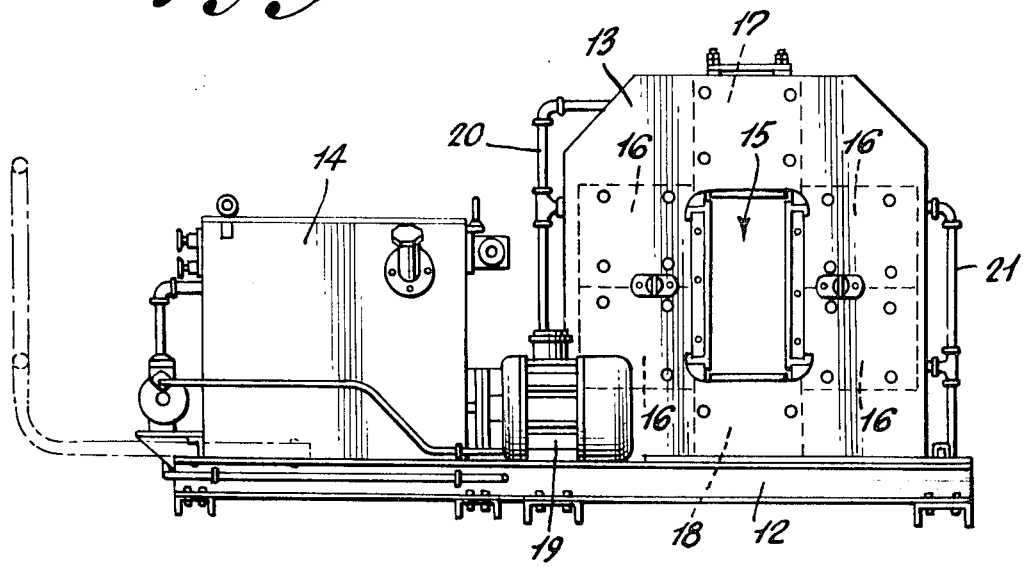
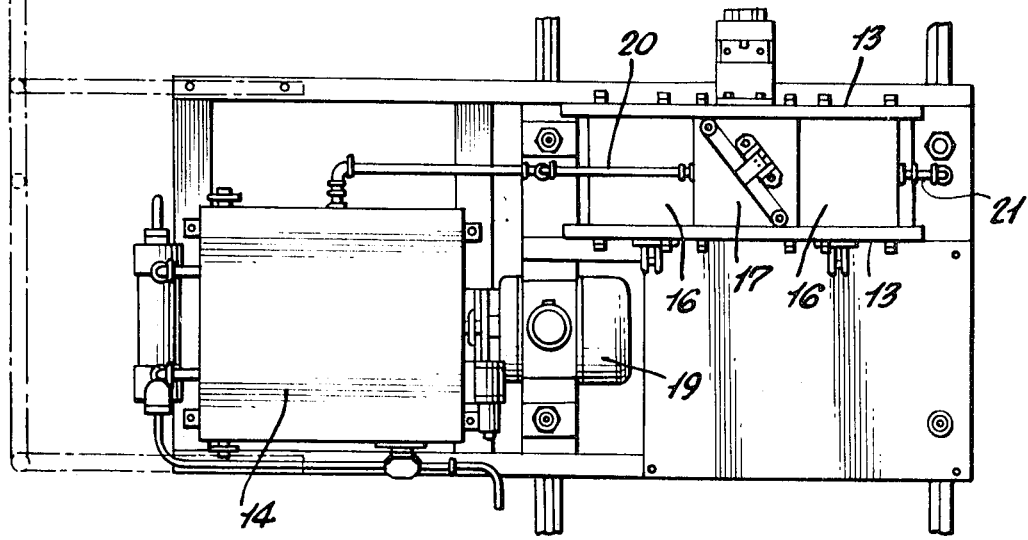

United States Patent Office 3,609,815
Patented Oct. 5, 1971

3,609,815
INJECTION MOLDING MACHINES
Guy Rudolf, Vernon, and Glaude Lebreton, Gamilly, Vernon, France, assignors to Bata Shoe Company, Inc., Belcamp, Md.
Filed Jan. 10, 1969, Ser. No. 790,376
Int. Cl. B29f 1/06
U.S. Cl. 18—30 LM    5 Claims

ABSTRACT OF THE DISCLOSURE

An injection molding machine particularly for producing footwear in which a rotatable table or turret carrying a plurality of molds is adapted to be indexed to bring a mold into cooperative alignment with at least one injection unit to allow melted plastic material to be injected into the mold. A locking press is rigidly connected to the injection unit for effecting a locking of the mold thereby assuring an air tight condition of the mold at the moment of the injection of the melted plastic material.

BACKGROUND OF THE INVENTION

In the art of injection molding particularly for producing footwear, it is known to employ a rotary table on which a plurality of molds are mounted and around the periphery of the table are disposed a plurality of injection units which are operably connected with the molds in a successive fashion as the table rotates. The main problem in the operation of this type of equipment resides in the achievement of an air tight state of the mold under pressure during the period in which the melted plastic material is being injected by the injection units. Various techniques have been proposed for overcoming this problem but most of the techniques involve cumbersome and expensive mechanisms for applying the necessary pressure upon each mold in order to make the molds air tight by locking the molds.

Other processes or techniques use a locking assemblage which is independent of each mold but which must open sufficiently wide to allow the substitution of one mold for another. In all situations, the synchronizing mechanism must operate with the injection unit with the injection unit effecting an alternate movement in the following sequences, namely, the juncture with the mold, the injection of the melted plastic material, and the release of the mold.

SUMMARY OF THE INVENTION

The primary object of this invention is to provide an injection molding machine which overcomes the above and other objectionable features existing in the art.

To accomplish the desired ends, the invention relates to a machine for injection molding and particularly a machine for the injection molding of footwear of the type including a rotary table or turret supporting a plurality of molds, and at least one injection unit operably related thereto and capable of being moved into a position in which the injection unit can inject material into the mold in alignment therewith and further including a locking press rigidly associated with the injection unit for effecting the desired locking and thus the air tight condition of the mold at the moment the injection unit injects the plastic material into the mold.

More specifically, the locking press and the injection unit are mounted on a common carriage actuated with a to and fro movement for enabling the locking press to frame each mold, maintain the mold during the injection cycle and thereafter release the mold for the removal thereof. Moreover, the locking press includes hydraulic jack means operably related to the sides, the upper portion and the lower portion of the mold in order to provide a clamping of the mold on all sides except the front and rear.

Further objects and advantages of the invention will become more readily apparent to persons skilled in the art from the following detailed description and annexed drawings and in which drawings:

BRIEF DESCRIPTION OF THE DRAWINGS

FIG. 1 is a view in elevation of an injection molding machine embodying the present invention illustrating the locking press connected to the injection unit during the molding cycle, FIG. 2 is a view similar to FIG. 1 illustrating the locking press and injection unit separated from each other during the mold release cycle.

FIG. 3 is a top plan view illustrating the injection unit separated from the locking press during the mold release cycle, FIG. 4 is a view in elevation of the locking press, FIG. 5 is a view in side elevation of the locking press illustrated in FIG. 4, and, FIG. 6 is a top plan view of the locking press shown in FIGS. 4 and 5.

DETAILED DESCRIPTION OF THE INVENTION

As illustrated in the drawings and attention is directed to FIG. 1, the molding machine includes a stationary frame 1 on which a carriage 2 is mounted for alternating reciprocal movement as denoted by arrow F1 (FIG. 2). The frame 1 and carriage 2 are operably associated with a molding table or turret 3 which carries a plurality of molds 4 distributed along its periphery as indicated in FIG. 3. While the table 3 is illustrated as carrying ten molds which are for use in the manufacture of footwear, it is to be understood that a lesser or greater number of molds can be provided for the table 3.

The table 3 is adapted to be rotated intermittently in a direction as indicated by arrow F2 in FIG. 3 by a suitable drive mechanism. The drive mechanism includes a connecting rod 5, a crank 6, a worm reduction gear including a worm wheel 7, a crank pin 8 and a Maltese cross 9. This particular drive mechanism actuates, among others, the reciprocating movement imparted to the carriage 2.

The movable carriage 2 also carries an injection unit 10 for plastic material and a locking press denoted generally 11.

It should be noted that the molding machine operates in such a fashion that at each injection by the injection unit 10 into a mold 4 on the table 3, the carriage 2 moves toward the table so that the press 11 encircles or embraces the mold 4 which is in alignment therewith and ensures the proper locking and air tightness of this particular mold. The injection is effected while the mold 4 is locked in the frame of the press under the pressure of the press. One the injection cycle has been completed, the carriage 2 moves in the opposite direction so as to release the press 11 from the mold 4. The table then rotates through an angle which corresponds to the distance between two molds in order to enable the positioning of the next mold and the foregoing operations are again repeated and this of course applies to each of the molds.

The locking press 11 is more fully illustrated in FIGS. 4–6 and it will be noted that the press includes a base or stand 12 which supports the press frame per se which is defined by two side plates or walls 13 and an oil tank or reservoir 14.

Hydraulic jacks denoted 15 in FIG. 4 serve for holding the molds and there are six such jacks which are arranged as follows. Two groups of two jacks 16 are arranged for the sides of the mold, a jack 17 for the upper part of the mold and a jack 18 for the lower part of the molds. The above mentioned jacks provide the clamping of the mold in all directions except at the front and rear to allow the release of the press. The oil or other fluid is directed from the tank 14 to the jacks via a pump driven by an electric motor 19 which forces or returns the oil or fluid through pipelines 20 and 21.

The jack assemblages, which have a large cross section (290 mm.$^2$) possess a very low stroke thereby enabling the provision of a very compact press with a great locking power.

In the assemblage above described, a hydraulic pressure of 300 bars is realized with the utilization of the tank 14, jacks 15–18 and the electric motor 19. As a variant thereof, it is also possible to utilize a pressure multiplier employing the hydraulic energy of the injection unit for distributing the oil to the locking press 11. It should be mentioned that the jacks employed develop a force of approximately 80 tons which, in the present situation, produces a lateral clamping of the mold of 160 tons and a vertical clamping of 80 tons.

It is to be understood that the present invention is not to be confined to a strict conformity to the showing made in the drawings but changes or modifications may be made therein so long as such changes or modifications mark no material departure from the spirit and scope of the appended claims.

What we claim is:

1. An injection molding machine particularly for producing footwear, comprising a rotatable table, a plurality of molds carried by said table, at least one injection unit capable of axial movement relative to the table and the molds thereon for injecting melted plastic material into the molds, when adjacent thereto, means to rotate the table to bring a mold into alignment with the injection unit, and a locking press rigidly connected to the injection unit for effecting a locking of the fold thus assuring an air tight condition of the mold at the moment of injection, said press including components positioned on each side, the upper portion and the lower portion and means for moving said components into engagement with the sides, top and bottom of the mold to effect clamping of the mold and for moving said components out of engagement with the mold after injection.

2. The injection molding machine as claimed in claim 1 including a common carriage on which said injection unit and locking press are mounted, and means imparting a to and fro movement to said carriage for permitting said press to encircle each mold, maintain the thus encircled mold during injection and thereafter release the same for removal of the mold.

3. The injection molding machine as claimed in claim 2 including means for synchronizing the rotary movement of the table with reciprocating movement of the carriage.

4. The injection molding machine as claimed in claim 1 in which said components include hydraulic jacks.

5. The injection molding machine as claimed in claim 4 in which the means for moving said components is hydraulic means for applying pressure to said jacks.

References Cited

UNITED STATES PATENTS

| | | | |
|---|---|---|---|
| 2,115,590 | 4/1938 | Ryder | 18—30(LA) |
| 2,392,203 | 1/1946 | Tucker | 18—30(LKF) |
| 3,008,189 | 11/1961 | Harvey | 18—30(LKF) |
| 3,165,796 | 1/1965 | McDonald | 18—30(LM)X |
| 3,195,186 | 7/1965 | Gauban et al. | 18—30(LA)X |
| 3,323,173 | 6/1967 | Poyner | 18—30(LA) |
| 3,468,367 | 9/1969 | Bauer | 18—30(LM)X |

FOREIGN PATENTS

| | | | |
|---|---|---|---|
| 1,413,977 | 9/1965 | France | 18—30(LA) |
| 419,587 | 1/1965 | Switzerland | 18—30(LA) |

J. SPENCER OVERHOLSER, Primary Examiner

M. O. SUTTON, Assistant Examiner

U.S. Cl. X.R.

18—20 H, 30 JA